United States Patent
Foster et al.

(10) Patent No.: US 10,688,938 B2
(45) Date of Patent: Jun. 23, 2020

(54) HITCH-MOUNTED CARGO CARRIER

(71) Applicants: Andrew J. Foster, Bettendorf, IA (US); John Whitmarsh, East Moline, IL (US)

(72) Inventors: Andrew J. Foster, Bettendorf, IA (US); John Whitmarsh, East Moline, IL (US)

(*) Notice: Subject to any disclaimer, the term of this patent is extended or adjusted under 35 U.S.C. 154(b) by 0 days.

(21) Appl. No.: 16/108,700

(22) Filed: Aug. 22, 2018

(65) Prior Publication Data
US 2019/0061636 A1    Feb. 28, 2019

Related U.S. Application Data

(60) Provisional application No. 62/548,439, filed on Aug. 22, 2017.

(51) Int. Cl.
*B60R 9/06*    (2006.01)
*B60R 9/10*    (2006.01)

(52) U.S. Cl.
CPC .............. *B60R 9/06* (2013.01); *B60R 9/065* (2013.01); *B60R 9/10* (2013.01)

(58) Field of Classification Search
CPC ...... B62D 63/061; B62D 63/065; B62B 1/00; B60P 3/07; B60P 3/34; B60P 3/105; B60R 9/065; B60R 9/055; B60R 9/045; B60R 9/048
See application file for complete search history.

(56) References Cited

U.S. PATENT DOCUMENTS

| | | | |
|---|---|---|---|
| 3,582,131 A * | 6/1971 | Brown ................. | B60P 3/34 296/26.02 |
| 4,014,586 A * | 3/1977 | Swofford .............. | B60P 3/341 296/169 |
| 4,126,324 A * | 11/1978 | Browning ............ | B62D 63/061 280/42 |
| 4,372,568 A | 2/1983 | Campbell | |
| 4,758,008 A * | 7/1988 | Moddejonge ......... | B62D 63/061 280/37 |
| 4,824,163 A * | 4/1989 | Hendrych ............ | B60P 7/02 108/34 |
| 5,249,821 A * | 10/1993 | Ricketts .............. | B62D 63/061 280/638 |
| 5,375,902 A * | 12/1994 | Church ............... | B60P 3/341 296/169 |

(Continued)

*Primary Examiner* — Brian D Nash
(74) *Attorney, Agent, or Firm* — Boudwin Intellectual Property; Daniel Boudwin

(57) ABSTRACT

A hitch-mounted cargo carrier designed to remove provide transport of cargo outside a vehicle. The hitch-mounted cargo carrier has a container designed to store cargo, having a base with a perimeter and a plurality of sidewalls extending therefrom. One or more lid members are attached to an upper edge of a sidewall and designed to enclose the container, such that each lid member has an upper surface designed to support cargo thereon, in addition to one or more extendable legs affixed thereon. A frame is disposed around the container and designed to support the container using a support rod. The support rod has a first section and a second section connected by an intermediate bar, wherein one end of the first section is designed to removably secure to a trailer hitch. In this way, a user is able to easily transport cargo without encumbering the space within their vehicle.

17 Claims, 5 Drawing Sheets

(56) References Cited

U.S. PATENT DOCUMENTS

| | | | | |
|---|---|---|---|---|
| 5,524,383 A * | 6/1996 | Sanko | ................... | A01G 9/20 217/43 A |
| 5,595,414 A * | 1/1997 | Dulnig | ................ | B60P 3/0257 296/21 |
| 5,761,854 A * | 6/1998 | Johnson | ................... | B60P 3/34 135/116 |
| 6,217,106 B1 * | 4/2001 | Reckner, Jr. | ............ | B60P 3/341 296/169 |
| 6,283,537 B1 * | 9/2001 | DeVore, III | ............ | B60P 3/341 296/168 |
| 6,446,997 B1 * | 9/2002 | Bergman | .............. | B60P 3/1041 280/414.3 |
| 6,739,617 B1 * | 5/2004 | Martin | ................... | B60P 3/341 280/656 |
| 6,962,370 B2 * | 11/2005 | Simpson | .............. | B62D 63/061 280/47.34 |
| 7,073,816 B1 * | 7/2006 | Larson | ................ | B62D 63/061 280/656 |
| 7,144,070 B2 | 12/2006 | Wiebe et al. | | |
| 7,156,273 B2 | 1/2007 | Morris | | |
| 7,159,893 B2 * | 1/2007 | Badger | ..................... | B60P 3/07 280/415.1 |
| 7,165,779 B2 * | 1/2007 | Badger | ..................... | B60P 3/07 280/415.1 |
| 7,677,592 B2 * | 3/2010 | Giesler | .................... | B60P 3/07 280/656 |
| 8,061,571 B2 | 11/2011 | Aghajanian | | |
| 8,240,732 B2 | 8/2012 | Bernart | | |
| 9,718,411 B2 * | 8/2017 | Field, Jr. | ................... | B60R 9/06 |
| 9,932,078 B1 * | 4/2018 | Nehring | .............. | B62D 63/061 |
| 10,206,495 B2 * | 2/2019 | Smith | ....................... | A47B 3/14 |
| 2003/0173758 A1 * | 9/2003 | Badger | .................... | B60P 3/07 280/656 |
| 2006/0158000 A1 * | 7/2006 | Warlick, III | ............. | B60P 3/36 296/37.1 |
| 2011/0221168 A1 * | 9/2011 | Alexander | ........... | B62D 63/061 280/639 |
| 2018/0178703 A1 * | 6/2018 | Keck | ......................... | B60P 1/43 |
| 2019/0193641 A1 * | 6/2019 | Garza, Jr. | ................ | B60R 9/08 |

* cited by examiner

HITCH-MOUNTED CARGO CARRIER

CROSS REFERENCE TO RELATED APPLICATIONS

This application claims the benefit of U.S. Provisional Application No. 62/548,439 filed on Aug. 22, 2017. The above identified patent application is herein incorporated by reference in its entirety to provide continuity of disclosure.

BACKGROUND OF THE INVENTION

The present invention relates to a hitch-mounted cargo carrier configured to store and transport objects therein. More specifically, the present invention provides a rectangular container with lid members supported by a frame. The frame is affixed to a support rod, having two sections joined by an intermediate bar, wherein one end of the support rod is configured to affix to a trailer hitch.

Many people use their cars to transport a variety of items, each of which may take up a large amount of space. When transporting food or dirty laundry, the smells can seep into the interior of the vehicle. Some people may attach an external cargo carrier on the roof of their vehicle, but this can be cumbersome and difficult to access. Others may choose to purchase a trailer to affix to the rear of their vehicle, however, this can lead to expensive insurance policies and increased tolls. Therefore, a hitch-mounted cargo carrier adapted to easily store and transport a plurality of items atop or within the hitch-mounted cargo carrier is needed.

SUMMARY OF THE INVENTION

In view of the foregoing disadvantages inherent in the known types of cargo carrier now present in the known art, the present invention provides a hitch-mounted cargo carrier wherein the same can be utilized for providing convenience for the user when desiring to remove a plurality of different objects outside their vehicle.

The present system comprises a hitch-mounted cargo carrier having a container with a base, wherein the base has a perimeter and a plurality of sidewalls extending therefrom. One or more lid members are affixed to an upper edge of a sidewall and configured to enclose the container, such that each lid member has an upper surface configured to support cargo thereon, in addition to one or more extendable legs affixed thereon. A frame is disposed around the container and configured to support the container using a support rod. The support rod has a first section and a second section connected by an intermediate bar, wherein one end of the first section is configured to removably secure to a trailer hitch. In this way, a user is able to easily transport cargo without encumbering the space within their vehicle.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
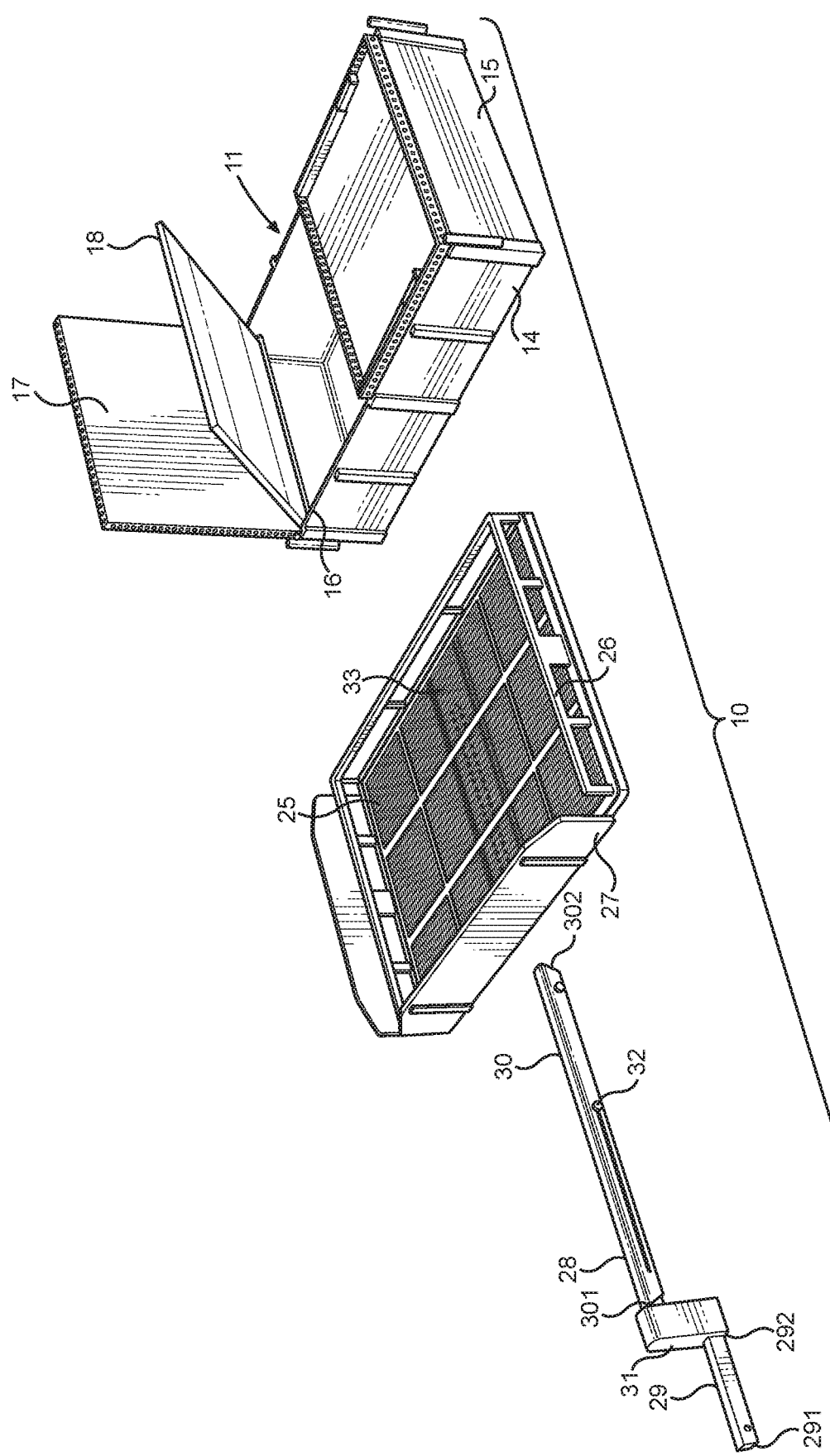
FIG. 1 shows an exploded view of an embodiment of the hitch-mounted cargo carrier.

Reference is made herein to the attached drawings. Like reference numerals are used throughout the drawings to depict like or similar elements of the multi-pronged tool. The figures are intended for representative purposes only and should not be considered to be limiting in any respect.

Figure 2:
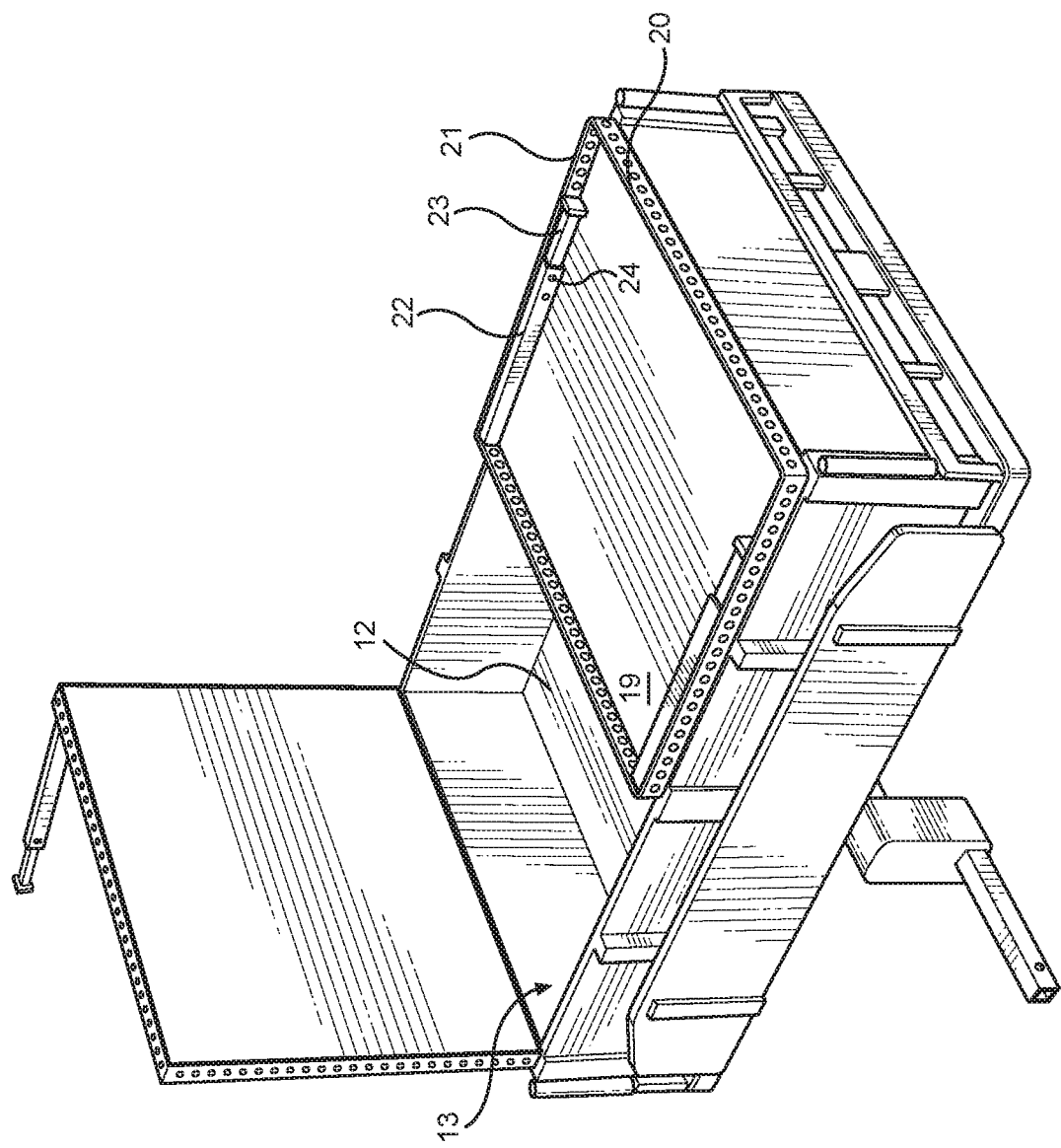
FIG. 2 shows a perspective view of an embodiment of the hitch-mounted cargo carrier.

Referring now to FIG. 1 and FIG. 2, there is shown an exploded view and a perspective view of an embodiment of the hitch-mounted cargo carrier, respectively. A hitch-mounted cargo carrier 10 comprises a container 11, having a base 12 with a plurality of sidewalls extending therefrom. Each sidewall is flush against another sidewall, such that an enclosure having an interior 13 is formed therein, wherein the interior 13 is configured to hold cargo. In one embodiment, the container 11 further comprises a plurality of modular compartments configured to fit flush within the container 11, such that each modular compartment is frictionally secured.

In the shown embodiment in FIG. 1, the base 12 is rectangular, such that the interior 13 forms a box. In the illustrated embodiment, the container 11 has two lateral sidewalls 15 that are disposed opposite one another and are equivalent in length. The container 11 additionally comprises two longitudinal sidewalls 14 that are disposed opposite one another and perpendicular to the lateral sidewalls 15, wherein the longitudinal sidewalls 14 are equivalent in length to one another and greater in length than the lateral sidewalls 15.

At least one lid member 17 is affixed to an upper edge 16 of one of the plurality of sidewalls. In the illustrated embodiment, there are two lid members 17, wherein each lid member 17 is affixed to the upper edge 16 of one of the sidewalls such that each lid member 17 is affixed to a different sidewall. Each lid member 17 is configured to affix overtop the container 11, such that the total surface area of all lid members 17 are configured to be equivalent to the surface area of the base 12, such that the lid members 17 fully enclose the interior volume 13.

In the shown embodiment, each lid member 17 is hingedly affixed to the upper edge 16 of the sidewall, such that each lid member 17 is configured to rotate around the upper edge 16 to rest flush against an outer surface of the container 11. This allows a user to access the interior volume 13 from any side of the container 11 while allowing each lid member 17 to remain affixed to the container 11 such that the lid members 17 are not misplaced. However, in other embodiments, each lid member 17 is removably affixed to the upper edge 16 via a fastener, such as a clip or a latch, such that the lid member 17 can be completely removed. This allows a user to access the interior volume 13 when the container 11 is in an area where there is not enough space to allow the lid members 17 to open via rotation.

In the illustrated embodiment in FIG. 1, the two lid members 17 are each disposed on each of the lateral sidewalls 15, such that they are opposing one another and configured to rotate away from one another when opened.

However, in other embodiments each lid member 17 is affixed to a varying sidewall, such that in one embodiment both lid members 17 are disposed proximally to one another on one of the longitudinal sidewalls 14, whereas in another embodiment each lid member 17 is disposed on each of the longitudinal sidewalls 14, such that the lid members 17 are offset from one another and disposed diagonally so as not to interfere with one another when rotating open or closed.

Each lid member 17 has an upper surface 19 and a lower surface. The upper surface 19 is planar, such that it is configured to support additional cargo thereon, such as a tarp or a bike rack. In the illustrated embodiment, the upper surface 19 of each lid member 17 comprises a raised flange 20 disposed about the perimeter of each lid member 17 configured to provide an additional aid when securing the cargo on the upper surface 19 of the lid member 17, such that the objects are confined to the upper surface 19. In the shown embodiment, the flange 20 has a plurality of apertures 21 disposed at even intervals, thereby allowing a user to tie down any cargo placed atop the upper surface 19 of the lid member 17.

Additionally, each lid member 17 has at least one extendable leg 23 disposed on the upper surface 19. In the illustrated embodiment, there is one extendable leg 23 disposed on each lid member 17. Each extendable leg 23 is disposed in a casing 22 configured to hold the extendable leg 23 therein. Each casing 22 has one or more apertures 24 that allow a user to lock the extendable leg 23 into place once it has been extended to a desired length. In the shown embodiment, each extendable leg 23 is disposed in a corner of the lid member 17 such that it rests flush against the upper surface 19 and extends along the longitudinal sidewall 14 parallel to the upper surface 19 of the container 11. Each casing 22 and extendable leg 23 therein is configured to rotate ninety degrees prior to extending. In this way, the user can rotate and extend each casing 22 and extendable leg 23 prior to opening and rotating each lid member 17, thereby allowing the user to utilize the lower surface of each lid member 17 as a table supported by the extendable legs 23.

In the illustrated embodiment, the container 11 further comprises at least one secondary lid member 18, wherein each lower lid member 18 is configured to rest flush against the lower surface of each lid member 17. Each secondary lid member 18 is sized to fit flush beneath the lid member 17 above it and is similarly affixed to the container beneath the lid members 17 within the interior 13 of the container 11 such that it does not interfere with the operation of the lid members 17. In the illustrated embodiment, the lower lid members 18 are also hingedly affixed to the container 11 and are configured to act as a table surface when the lid members 17 are rotated away from the container 11.

The hitch-mounted cargo carrier 10 further comprises a frame 25, configured to removably receive and support the container 11. As such, the frame 25 is rectangularly shaped in the illustrated embodiment, having two lateral sides and two longitudinal sides disposed similarly to the container 11. Additionally, the frame 25 is configured to support larger cargo therein that may otherwise not fit inside the container 11, such as a small riding mower.

The frame 25 has a support bar 26 disposed about a perimeter of the frame 25, wherein the support bar 26 is configured to enclose a portion of a lower body of the container 11 and is sized to fit flush around a perimeter of the container 11. In the illustrated embodiment, the support bar 26 extends upward to support the container 11 and prevent the container 11 from moving while disposed in the frame 25.

In another embodiment, a support siding 27 is additionally disposed along an outer surface of the support bar 26 on one or more sides of the frame 25. The support siding 27 is configured to provide greater support and stability to the container 11 when the container 11 is secured to the frame 25. As such, the support siding 27 extends further up the side of the container 11 than the support bar 26 on the respective sides on which the support siding 27 is disposed. In the illustrated embodiment, the support siding 27 is disposed on two sides of the frame 25, such that the support siding 27 is disposed on one lateral side of the frame 25 and one longitudinal side of the frame 25. However, in other embodiments the support siding 27 varies with respect to which specific sides of the frame 25 it is disposed thereon, such that the support siding 27 can be disposed on both lateral sides or both longitudinal sides of the frame 25. Further, the support siding 27 can also vary with respect to the number of sides of the frame 25 on which it is disposed, such that the support siding 27 can be disposed on only one of the sides of the frame 25 or on three sides of the frame 25 or on all four sides of the frame 25.

The hitch-mounted cargo carrier 10 further comprises a support rod 28, having a first section 29 and a second section 30 removably secured to one another via an intermediate bar 31. Each section of the support rod 28 has a first end and a second end. The first end 291 of the first section 29 is configured to removably secure to a trailer hitch. In the illustrated embodiment, the second end 292 of the first section 29 of the support rod 28 is secured into the intermediate bar 31, as is the first end 301 of the second section 30 of the support rod 28. In one embodiment, the second section 30 is permanently offset from the first section 29 when both are removably secured within the intermediate bar 31, such that each section is disposed at a different vertical height. In the shown embodiment, however, the height of the second section 30 is changeable within the intermediate bar 31, such that the height of the second section 30 is offset from the first section wherein the second section 30 is of equivalent or greater height than the height of the first section 29. The height of the second section 30 is adjustable up to a terminal end of the intermediate bar 31.

The second end 302 of the second section 30 is configured to removably affix to a support casing 33 disposed on a lower surface of the frame 25. The support casing 33 is dimensioned to receive the second end 302 of the second section 30 of the support rod 28 therein. In the illustrated embodiment, the second section 30 of the support rod 28 is telescopic, such that a length of the second section 30 is adjustable, thereby allowing a user to control the distance of the container 11 from the intermediate bar 31 through a sliding section 32. The first end 291 of the first section 29 of the support rod 28 is configured to removably secure to a hitch on a back end of a vehicle. The adjustability of the height of the second section 30 allows the user to freely change a height of the frame 25 and container 11 to ensure the height of the container 11 is offset from the hitch of the vehicle, thereby providing greater stability to the hitch-mounted cargo container 10.

Figure 3:
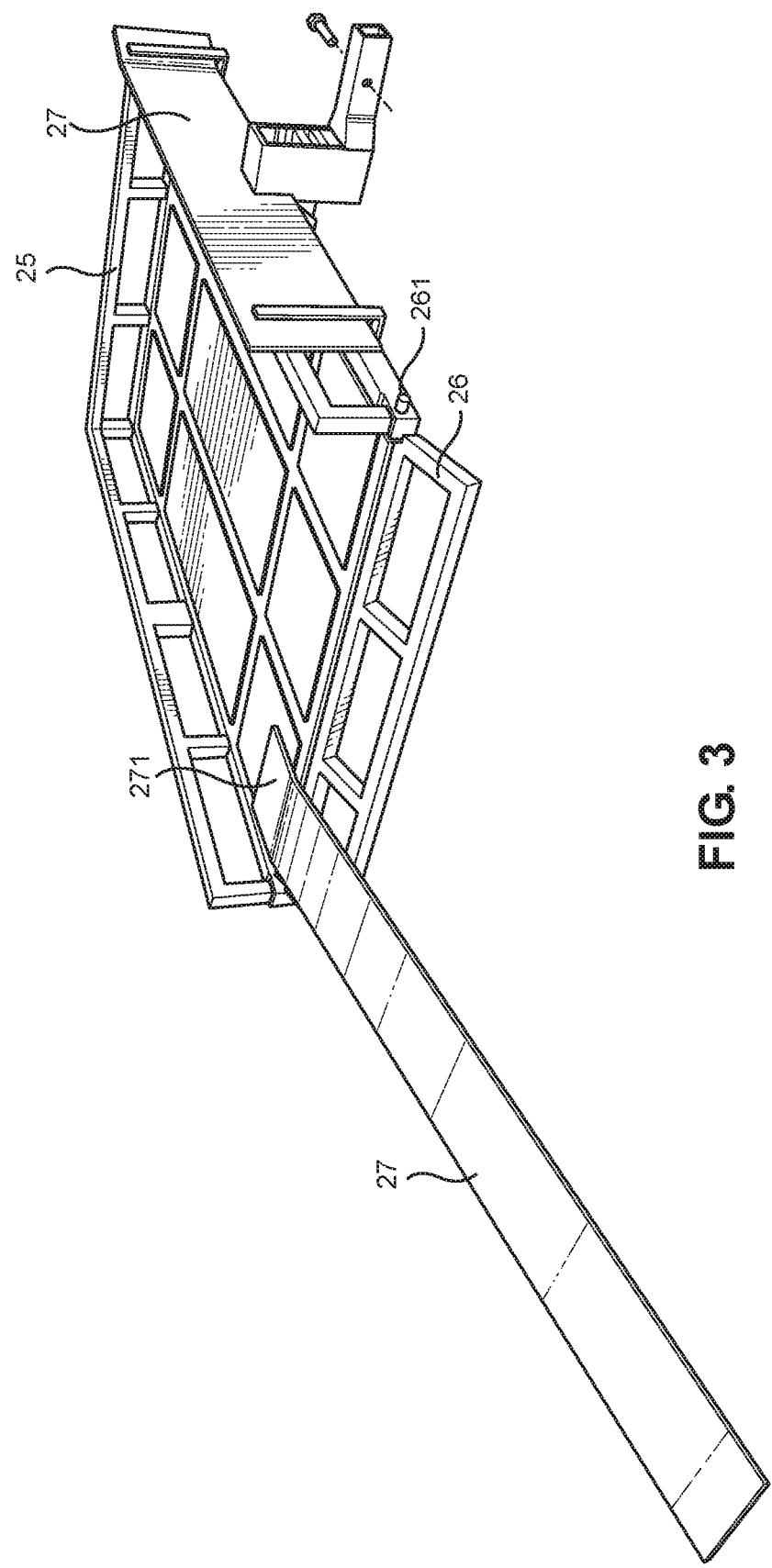
FIG. 3 shows a perspective view of an embodiment of the frame of the hitch-mounted cargo carrier.

Referring now to FIG. 3, there is shown a perspective view of an embodiment of the frame of the hitch-mounted cargo carrier. In the illustrated embodiment, at least one side of the support bar 26 is pivotably secured to the frame 25, such that the support bar 26 can be rotated. In the shown embodiment, the pivotable support bar 26 is held in place with a locking pin 261. When the locking pin 261 is pulled, the support bar 26 is free to rotate about an axis of the frame 25 edge. In this way, the user is able to move cargo into the frame 25 without having to lift the cargo over the support bar 26.

In the illustrated embodiment, the support siding 27 is reinforced to support additional weight and is removably secured to at least one side of the perimeter of the frame 25, such that the support siding 27 can be removed from the frame 25 and disposed elsewhere. In the shown embodiment, the support siding 27 has a tapered end 271 and a non-tapered end. The tapered end 271 is configured to sit flush against the base of the frame 25 when the support siding 27 is rotated ninety degrees, such that the support siding 27 provides a planar surface sloped towards the ground, wherein the non-tapered end rests against the ground. In this way, the support siding 27 is configured to act as a ramp, allowing a user to push cargo onto the frame 25 along the planar surface of the support siding 27.

Figure 4:
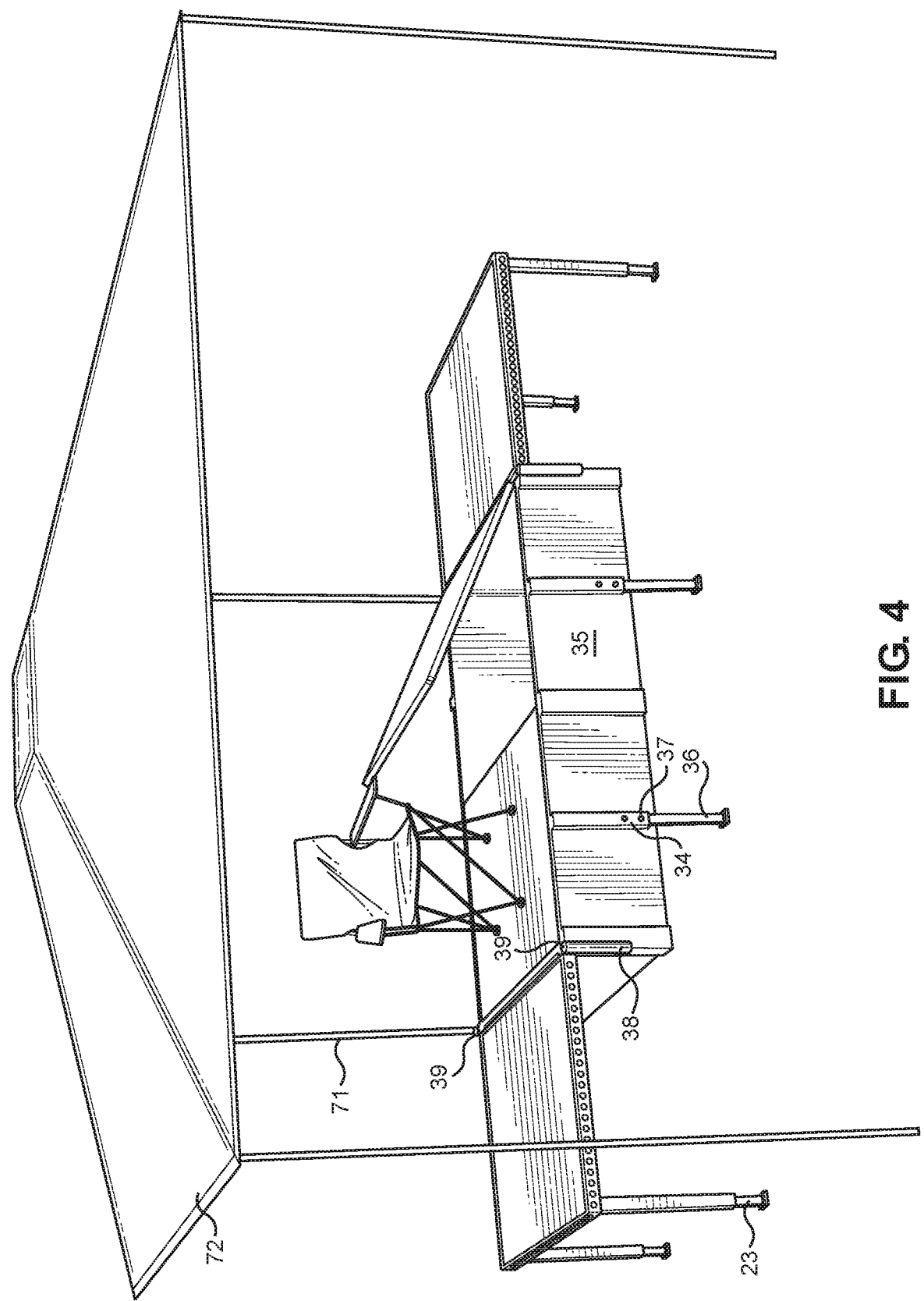
FIG. 4 shows a perspective view of an embodiment of the hitch-mounted cargo carrier in use as a raised platform.

Referring now to FIG. 4, there is shown a perspective view of an embodiment of the hitch-mounted cargo carrier in use as a raised platform. In one embodiment, at least one housing 34, having an opening at one end and sealed at an opposing end, is disposed on an outer surface 35 of the container. In the shown embodiment, each longitudinal side of the container has two housings 34 disposed at even intervals thereon, wherein each housing 34 is disposed such that each opening is aligned with the base of the container. A support leg 36 is slidably disposed within each housing 34, wherein each support leg 36 is configured to extend out of the housing 34 from the open end and lock into place at a predetermined point. In this way, the support legs 36 are configured to both raise and to brace the container when it is not affixed to a vehicle. In the illustrated embodiment, each housing 34 has one or more apertures 37 configured to accept a locking pin therethrough, such that the user can choose between one or more heights when extending each support leg 36.

In an additional embodiment, the container further comprises a plurality of cylindrical casings 38 disposed along one or more corners of the container, wherein each cylindrical casing 38 has an opening 39 at one end and is sealed at an opposing end. In the illustrated embodiment, the cylindrical casings 38 are disposed such that the openings 39 are aligned with the upper surface of the container, and the cylindrical casings 38 are disposed on each of the corners of the container. Each cylindrical casing 38 is configured to accept a pole 71 therein, such as from an umbrella or tent 72. Thereby, a user can set up a tent 72 to cover the container by removably securing the pole 71 of the tent 72 within the cylindrical casing 38. In this way, a user can set up the container as a platform or table, wherein the container is supported by a plurality of the support legs 36 and extendable legs 23 while the tent 72 is secured overtop the container with the tent poles 71 disposed in the cylindrical casings 38.

Figure 5:
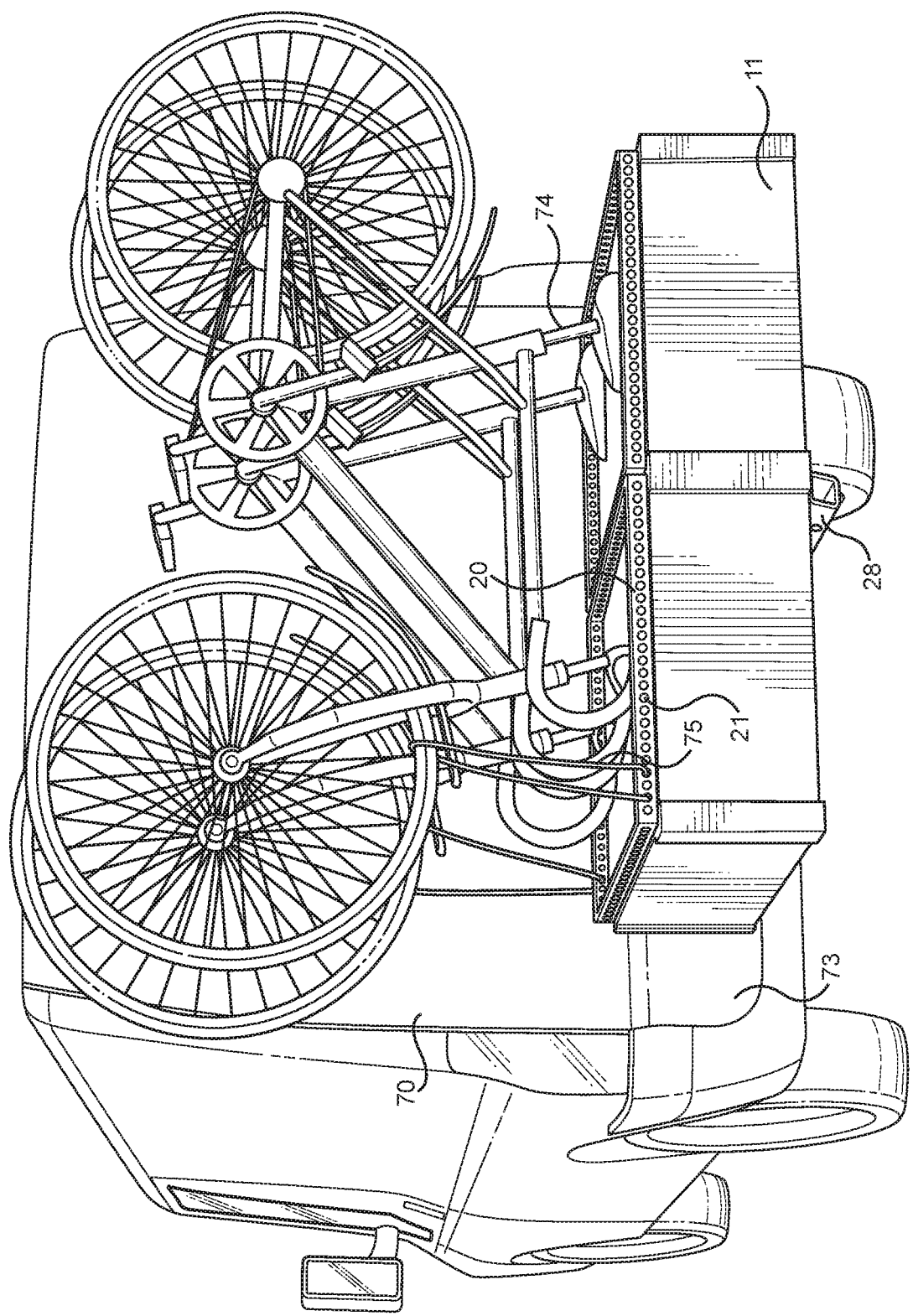
FIG. 5 shows a perspective view of an embodiment of the hitch-mounted cargo carrier affixed to a vehicle with one or more pieces of cargo secured on the upper surface of the lid members.

Referring now to FIG. 5, there is shown a perspective view of an embodiment of the hitch-mounted cargo carrier affixed to a vehicle with one or more pieces of cargo secured on the upper surface of the lid members. In operation, a user will affix the first end of the first section of the support rod 28 to a hitch disposed on the rear of a vehicle 70. The second end of the first section of the support rod 28 is then secured to the intermediate bar, and the first end of the second section of the support rod 28 is secured to the intermediate bar at an appropriate height, depending on the height of the vehicle 70 and the bumper 73 of the vehicle. The second end of the second section of the support rod 28 is then secured to the lower surface of the frame. The container 11 is disposed in the frame and the lid members are disposed overtop the container 11, enclosing any objects therein. One or more objects, such as a pair of bikes 74, are secured on the upper surface of the container. In the illustrated embodiment, the bikes 74 are secured via wire 75 by utilizing the apertures 21 disposed on the flanged edge 20 of the lid members. In this way, a user can secure any number of objects in or on a cargo container that is easily affixable to a trailer hitch of a vehicle, thereby allowing the user to easily carry a greater number of objects while additionally transporting the objects outside the vehicle.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hitch-mounted cargo carrier, comprising:
    a container, having a base and a plurality of sidewalls extending therefrom;
    at least one planar lid member, wherein each planar lid member is affixed to an upper edge of one of the plurality of sidewalls;
    at least one extendable leg affixed to an upper surface of each planar lid member;
    the upper surface of each planar lid member configured to support additional cargo thereon;
    a frame configured to removably receive and support the container;
    a support rod, having a first section and a second section, wherein each section of the support rod has a first end and a second end, wherein the second end of the second section is configured to removably secure to the frame;
    an intermediate bar configured to removably secure the first section of the support rod to the second section of the support rod, wherein the second end of the first section is removably secured to the first end of the second section, such that the first section and second section are not horizontally aligned;
    wherein the first end of the first section of the support rod is configured to secure to a trailer hitch.

2. The hitch-mounted cargo carrier of claim 1, wherein the container is rectangular.

3. The hitch-mounted cargo carrier of claim 1, wherein each planar lid member is hingedly affixed to an upper edge of the sidewall.

4. The hitch-mounted cargo carrier of claim 1, further comprising a secondary lid member disposed beneath the planar lid member.

5. The hitch-mounted cargo carrier of claim 1, wherein each extendable leg is disposed parallel to the upper surface of the lid member in a folded position and configured to rotate away from the lid member such that the extendable leg is disposed in a position to position the lid parallel to a ground surface.

6. The hitch-mounted cargo carrier of claim 1, wherein a flange is disposed around a perimeter of an upper surface of each planar lid member.

7. The hitch-mounted cargo carrier of claim 6, wherein a plurality of apertures is disposed throughout the flange.

8. The hitch-mounted cargo carrier of claim 1, further comprising a plurality of housings disposed on an outer surface of the sidewall, wherein each housing is configured to store an extendable leg therein.

9. The hitch-mounted cargo carrier of claim 1, wherein a cylindrical casing is disposed at an upper edge of each corner of the container, wherein each cylindrical casing is configured to receive a pole therein.

10. The hitch-mounted cargo carrier of claim 1, wherein the intermediate bar is configured to allow a user to adjust the height of the second section of the support rod such that the first section is offset from the second section.

11. The hitch-mounted cargo carrier of claim 1, wherein a support bar is disposed about a perimeter of the frame.

12. The hitch-mounted cargo carrier of claim 11, wherein at least one side of the support bar is pivotally secured to the frame such that one side of the support bar can rotate to allow cargo to be received therein.

13. The hitch-mounted cargo carrier of claim 1, wherein a support siding is removably secured about a perimeter of the frame.

14. The hitch-mounted cargo carrier of claim 13, wherein the support siding is reinforced such that it is configured to act as a ramp, wherein a first end of the support siding is affixed to the frame and a second opposing end of the support siding rests on a surface.

15. The hitch-mounted cargo carrier of claim 1, wherein the first section and the second section are parallel to each other.

16. The hitch-mounted cargo carrier of claim 5, wherein each extendable leg is disposed parallel to the upper surface of the lid member in a folded position and configured to rotate ninety degrees away from the lid member such that the extendable leg is disposed perpendicular to the upper surface of the lid member in an unfolded position.

17. A hitch-mounted cargo carrier, consisting of:
a container, having a base and a plurality of sidewalls extending therefrom;
at least one planar lid member, wherein each planar lid member is affixed to an upper edge of one of the plurality of sidewalls;
at least one extendable leg affixed to an upper surface of each planar lid member;
the upper surface of each planar lid member configured to support additional cargo thereon;
a frame configured to removably receive and support the container;
a support rod, having a first section and a second section, wherein each section of the support rod has a first end and a second end, wherein the second end of the second section is configured to removably secure to the frame;
an intermediate bar configured to removably secure the first section of the support rod to the second section of the support rod, wherein the second end of the first section is removably secured to the first end of the second section, such that the first section and second section are not aligned;
wherein the first end of the first section of the support rod is configured to secure to a trailer hitch.

* * * * *